No. 732,878. PATENTED JULY 7, 1903.
F. E. MOLKOW.
RANGE FINDING DEVICE.
APPLICATION FILED OCT. 2, 1902.
NO MODEL.
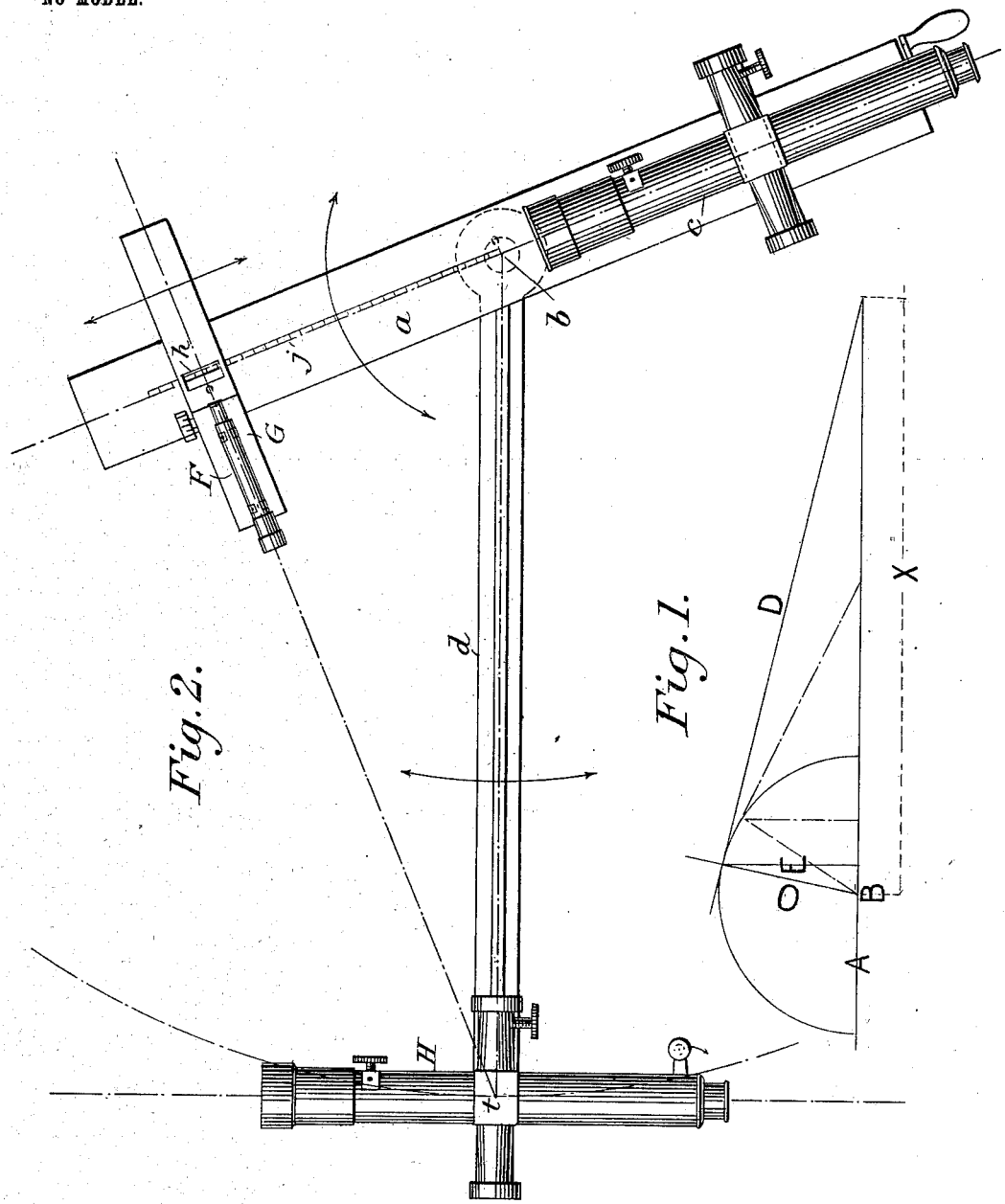

No. 732,878.

Patented July 7, 1903.

UNITED STATES PATENT OFFICE.

FERDINAND E. MOLKOW, OF WASHINGTON, DISTRICT OF COLUMBIA.

RANGE-FINDING DEVICE.

SPECIFICATION forming part of Letters Patent No. 732,878, dated July 7, 1903.

Application filed October 2, 1902. Serial No. 125,632. (No model.)

*To all whom it may concern:*

Be it known that I, FERDINAND E. MOLKOW, a citizen of the United States, residing at Washington, in the District of Columbia, have invented certain new and useful Improvements in Range-Finding Devices; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to range-finders, and has for its object the provision of a simple and efficient mechanism for determining the range of an object and provides a means by which an accurate and direct reading of its distance can be obtained.

The invention consists in an arrangement of telescopes or other sighting devices by means of which the foregoing object can be carried into effect, and inasmuch as the mechanical means or arrangement by which the telescopes may be operatively held in relation to each other for carrying out such purpose, may be indefinitely varied without departing from the underlying principle of the invention it will be understood that the mechanism described, which illustrates the invention in diagrammatic form, is not intended to limit the construction, but that the construction of the machine can be indefinitely varied without departing from the spirit of the invention.

In the drawings accompanying this specification, Figure 1 is a diagram showing the underlying principle of the device, and Fig. 2 is a diagrammatic view showing one means for carrying the same into effect.

The principle of the invention is clearly shown in Fig. 1, in which X represents the range the distance of which is to be determined. A is a line of sight passing through said object. B is a point on said line. O is a radius passing through point B and describing a circumference around said point. D is a second line of sight intersecting the radius O at right angles tangent to the circumference which the radius describes and intersecting the line of sight A, and E is a line of sight at right angles to the line A and intersecting the line of sight D at the point of tangency with O.

The measurement of the distance Z between the point B and the intersection of A and E will give, in accordance with the well-known formula, square of the radius O divided by distance Z, equal to X or range. One means for the measurement of this distance and arrangement of apparatus for this purpose is illustrated in Fig. 2, in which $a$ is a pivoted arm arranged to revolve about a center $b$. Mounted upon the arm $a$ at a point in the rear of the pivot $b$ is a telescope or sighting device C, with its line of sight passing through the center $b$. The arm $d$ is arranged to revolve about the center $b$ and carries a telescope H, arranged at right angles to the arm $d$ in such manner that its line of sight is tangent to the arc described by the revolution of said arm. It will be readily seen that the two telescopes C and H can be revolved upon the common center $b$ until their lines of sight will converge upon any given object.

The arm $a$ has mounted upon it in front of the center $b$ a small telescope F, arranged at right angles to the said arm, being therefore at right angles to the line of sight of telescope C. The telescope F is movable along the arm $a$ to and from the center $b$ and is preferably mounted upon a sliding block G, adapted to slide upon said arm, and provided with a vernier $h$ and a micrometer adjustment $i$ or other means by which great delicacy of reading may be obtained upon a scale $j$, engraved upon the upper side of the arm $a$. This scale $j$ measures the distance between the center point $b$ and the projection of the point of tangency at telescope H upon the arm $a$ or upon a line coincident with the line of sight of the telescope C. Now as the radius to which the telescope H is fixed is a constant distance and the angle which its line of sight makes to the radius is a right angle then a right-angle triangle is formed the verticii of which are at the center $b$, the point of tangency $t$, and the object. The line of sight of telescope F becomes the perpendicular dropped from the vertex of the right angle at telescope H, on the hypotenuse of which the arm $a$ is a part. The distance to the object is determined by the geometric principle that either leg of the right-angle triangle is a mean proportional between the hypotenuse and its adjacent segment. The distance to the object from the center $b$ is the hypotenuse, the radial arm is the leg, and the distance read is the adjacent segment.

The device described may be variously modified to meet the necessary requirements on ships of different construction, at fortifications for coast defense, and for use in surveying or other purposes, and it will be understood that it is not intended to limit the construction to the specific form described, but that all such modifications are within the scope and intention of this invention.

What I claim, and desire to secure as my invention, is—

1. A range-finder comprising a telescope arranged to revolve about a center with its line of sight passing through said center, a second telescope at right angles to a radius passing through said center with its line of sight tangent to a circumference which the radius describes, and a third telescope at right angles to the line of sight of the first, by which the distance between the point of tangency and the said center may be determined upon said line.

2. A range-finder comprising a telescope arranged to revolve around a center with its line of sight passing through said center, a second telescope movable to and from the first, and with its line of sight at right angles thereto, and a telescope arranged radially in relation to said center with its line of sight tangent to an arc described by said radius, as and for the purpose described.

3. In a range-finder the combination of a pivoted arm, a telescope mounted thereon with its line of sight passing through the pivotal point, a telescope at right angles to said arm and movable thereon to and from the pivotal point, a scale by which its distance from said point may be determined, a radial arm revoluble about the pivotal point, a telescope carried thereby at right angles to the radial arm and tangent to the arc described by said arm substantially as before described.

4. In a range-finder, the combination of a radial arm having a pivot at one end, a telescope at its other end at right angles thereto and tangent to the arc described by said arm, a bar mounted to swing on said pivot, a telescope carried thereby with its line of sight passing through the pivotal point, a scale carried by said bar, a telescope at right angles with said bar adapted to move thereon and read upon said scale, the distance from the projection of the point of tangency of the first telescope to the pivotal point, as and for the purpose described.

In testimony whereof I affix my signature in presence of two witnesses.

FERDINAND E. MOLKOW.

Witnesses:
A. M. BUNN,
JOHN T. SULLIVAN.